United States Patent
Zumdome et al.

(10) Patent No.: US 12,369,518 B2
(45) Date of Patent: Jul. 29, 2025

(54) COMMODITY DELIVERY FIELD DEBRIS GUARD

(71) Applicant: Deere & Company, Moline, IL (US)

(72) Inventors: Lee E. Zumdome, Bettendorf, IA (US); Michael E. Frasier, Iowa City, IA (US); Matt Arnold, Moline, IL (US)

(73) Assignee: Deere & Company, Moline, IL (US)

( * ) Notice: Subject to any disclaimer, the term of this patent is extended or adjusted under 35 U.S.C. 154(b) by 928 days.

(21) Appl. No.: 17/459,236

(22) Filed: Aug. 27, 2021

(65) Prior Publication Data

US 2023/0068227 A1   Mar. 2, 2023

(51) Int. Cl.
*A01C 7/20*  (2006.01)
*A01C 7/08*  (2006.01)

(52) U.S. Cl.
CPC . *A01C 7/20* (2013.01); *A01C 7/08* (2013.01)

(58) Field of Classification Search
CPC ................ A01C 7/20; A01C 7/08; A01C 7/00
See application file for complete search history.

(56) References Cited

U.S. PATENT DOCUMENTS

2004/0134400 A1   7/2004   Thiemke et al.
2016/0143213 A1   5/2016   Kowalchuk

FOREIGN PATENT DOCUMENTS

EP   2213153 A1   8/2010
EP   2901838 A1   8/2015

OTHER PUBLICATIONS

Extended European Search Report and Written Opinion issued in European Patent Application No. 22182652.2, dated Dec. 15, 2022, in 08 pages.

*Primary Examiner* — Christopher J. Novosad
(74) *Attorney, Agent, or Firm* — Tucker Ellis LLP; Patrick F. Clunk (57) ABSTRACT

A commodity debris guard for a commodity delivery apparatus may comprise a debris guard configured to mitigate debris from engaging with an endless member. The debris guard may comprise a first debris guard operably connected to a housing. The first debris guard may comprise a base and upwardly extending side portions. The first debris guard may be configured to mitigate debris from contacting an endless member positioned at least partially within the housing. A second debris guard may be operably connected to the housing and disposed forward and below the first debris guard. The second debris guard may be configured to mitigate debris from contacting the endless member comprising. The second debris guard may comprise a base, upwardly extending side portions, and an extension portion configured to channel commodity as it exits the extension member to an associated furrow of an underlying surface.

19 Claims, 11 Drawing Sheets

COMMODITY DELIVERY FIELD DEBRIS GUARD

BACKGROUND

When a commodity, such as seed, falls by gravity from the meter through the seed tube, it can be difficult to maintain accurate and consistent seed spacing at planting speeds. To maintain spacing accuracy, a seed delivery system that controls the seed as the seed moves from the seed meter to the soil has been utilized. At times, while an endless member rotates within a housing of the delivery system, debris from the crops and fields, such as cotton residue, corn stalks, bean residue, etc., may collect and be drawn into the seed delivery and metering system. As such, there is a need in the art to prevent such debris from entering the housing or contacting the endless member in the seed delivery system.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In one implementation, a commodity debris guard for a commodity delivery apparatus may comprise a debris guard configured to mitigate debris from engaging with an endless member. The debris guard may comprise a first debris guard operably connected to a housing. The first debris guard may comprise a base and upwardly extending side portions. The first debris guard may be configured to mitigate debris from contacting an endless member positioned at least partially within the housing. A second debris guard may be operably connected to the housing and disposed forward and below the first debris guard. The second debris guard may be configured to mitigate debris from contacting the endless member comprising. The second debris guard may comprise a base, upwardly extending side portions, and an extension portion configured to channel commodity as it exits the extension member to an associated furrow of an underlying surface.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

What is disclosed herein may take physical form in certain parts and arrangement of parts, and will be described in detail in this specification and illustrated in the accompanying drawings which form a part hereof and wherein.

DETAILED DESCRIPTION

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in order to facilitate describing the claimed subject matter.

Figure 1:
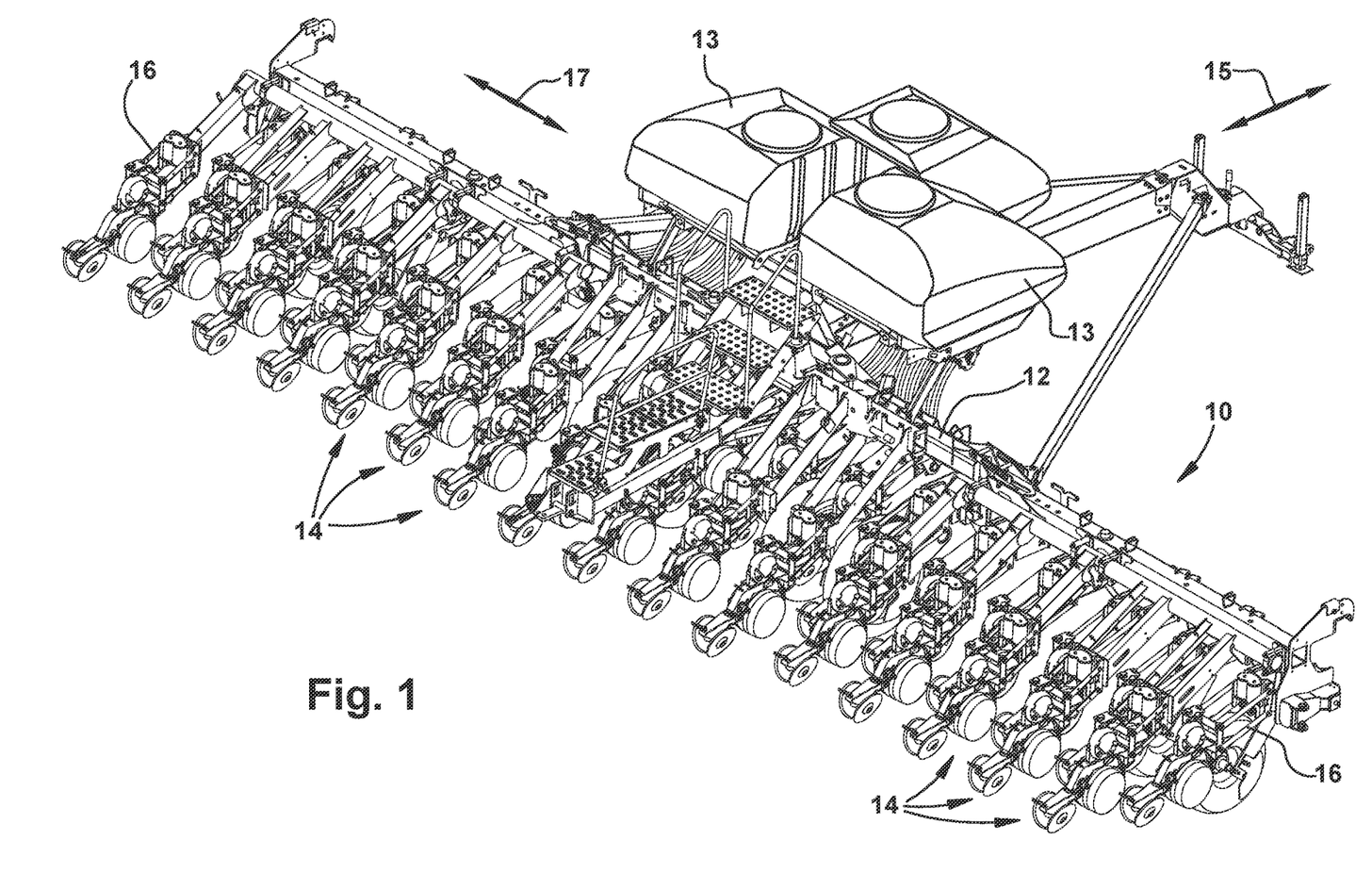
FIG. 1 is a perspective view of an agricultural seeder.

An example of an agricultural seeding machine 10 is shown in FIG. 1. The seeding machine 10 may have a central frame 12 on which are mounted a plurality of individual planting units 14. The seeding machine 10 may have a fore-aft direction shown by the arrow 15 and a transverse direction shown by the arrow 17. Each planting unit 14 may be coupled to the central frame 12 by a parallel linkage 16 so that the individual planting units 14 may move up and down to a limited degree relative to the frame 12. Large storage tanks 13 hold commodity such as seed or fertilizer that may be delivered pneumatically to a mini-hopper on each planting unit 14.

Figure 2:
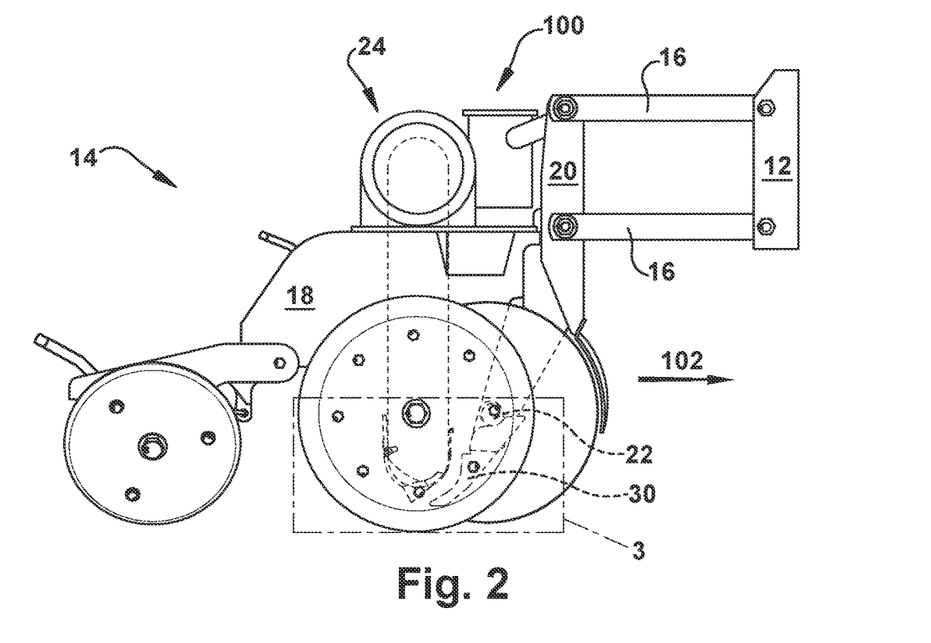
FIG. 2 is a perspective view of a component of an agricultural vehicle configured to deliver a commodity to the ground.

The agricultural seeding machine 10 travels in the direction of arrow 102, as shown in FIG. 2. Each planting unit 14 may have a frame member 18 as shown in FIG. 2 to which the components of the planting unit are mounted. The frame member 18 may comprise a pair of upstanding arms 20 at the forward end of thereof. The arms 20 are coupled to the rearward ends of the parallel linkage 16. Furrow opening disks may be attached to a shaft 22 in a known manner to form an open furrow in the soil beneath the seeding machine into which seed is deposited. Closing and packing wheels are also mounted to the frame member 18 in a known manner to close the furrow over the deposited seed and to firm the soil in the closed furrow. A rock guard 30 may extend downwardly from the shaft 22 and forward of a second debris guard (described below) to further protect the endless member 170 from encountering large debris such as rocks, gravel or other larger objects.

Figure 3:
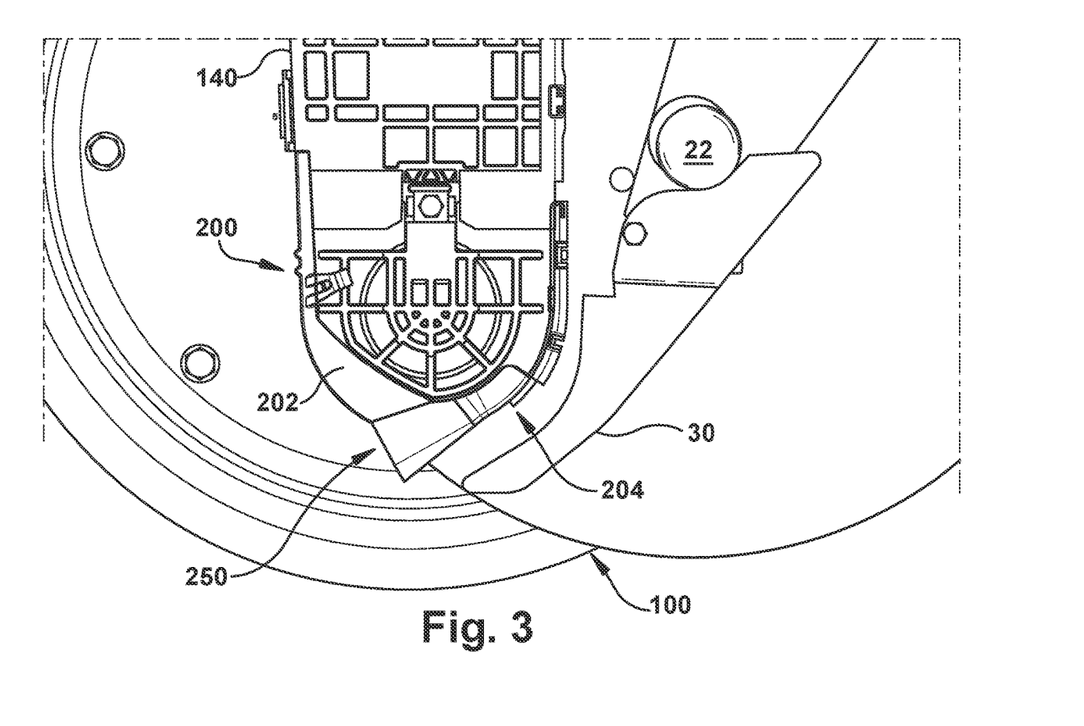
FIG. 3 is an enlarged view taken along the dotted lines designated by area 3 of FIG. 2.

A seed meter 24 and a seed delivery system 100 may also be attached to the frame member 18 of the planting unit. A support member 139 may comprise a housing 140 and/or an idler body 141. An endless member 170 may carry the commodity and be at least partially disposed within the housing 140. An idler body 141 may extend out of the housing 140 with a pulley to tension the endless member 170. In some implementations, the housing 140 may comprise the idler body 141. In other implementations, the housing 140 and the idler body 141 may be separate components. In another example, the endless member 170 may be entirely enclosed or substantially entirely enclosed inside the housing 140. In one example, the endless member 170 may be a brush belt. In another embodiment, the endless member may be a conveyor belt. In another implementation, the endless member 170 may be a flighted belt. In another implementation, the endless member 170 may be a flighted brush. In another implementation, the endless member may be at portion of at least one or more of a conveyor belt, a bush belt, a flighted brush, and a flighted belt.

Figure 4:
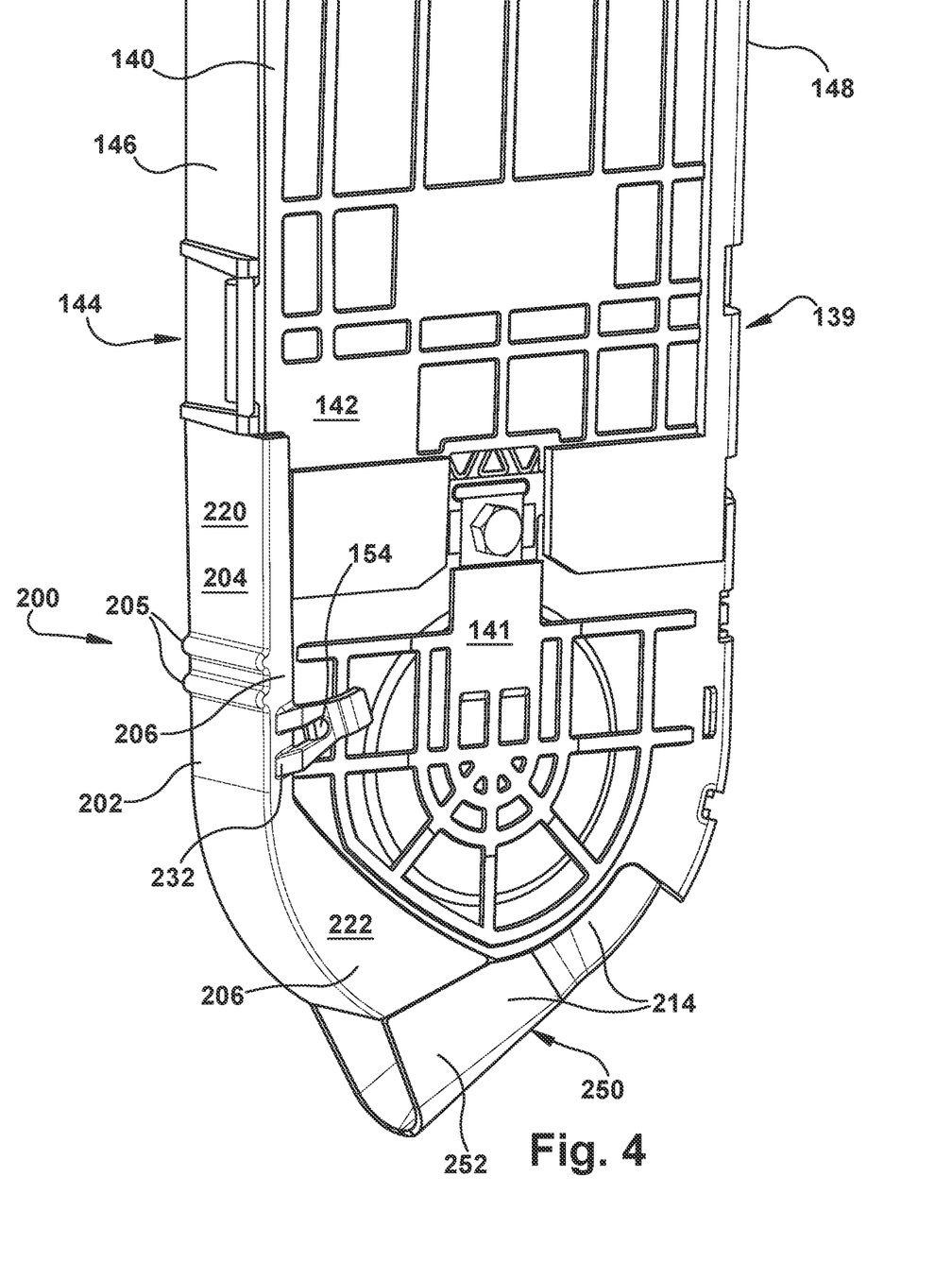
FIG. 4 is a front perspective view of the housing and commodity debris guard.
Figure 5:
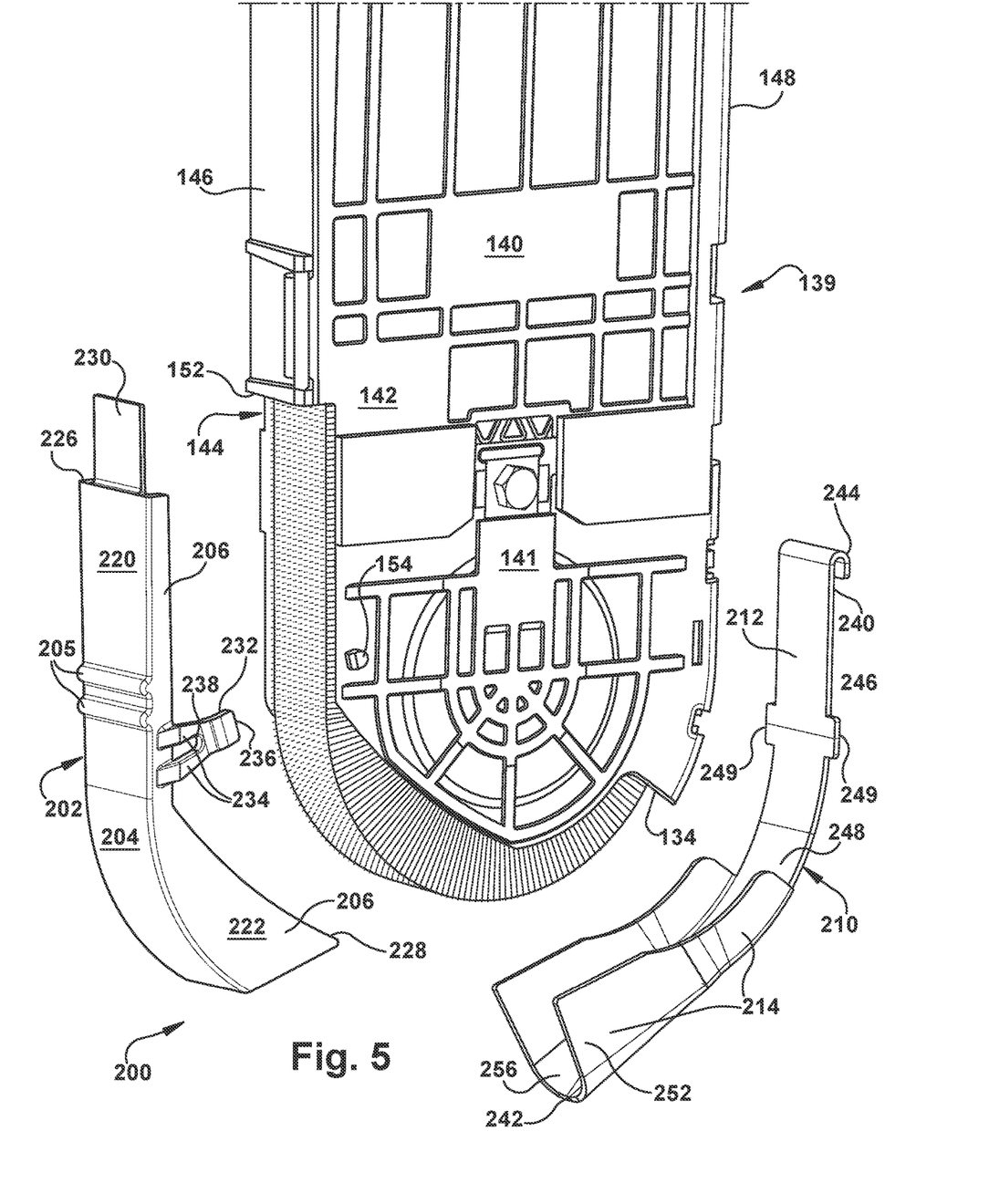
FIG. 5 is a partially exploded view of FIG. 4.
Figure 6:
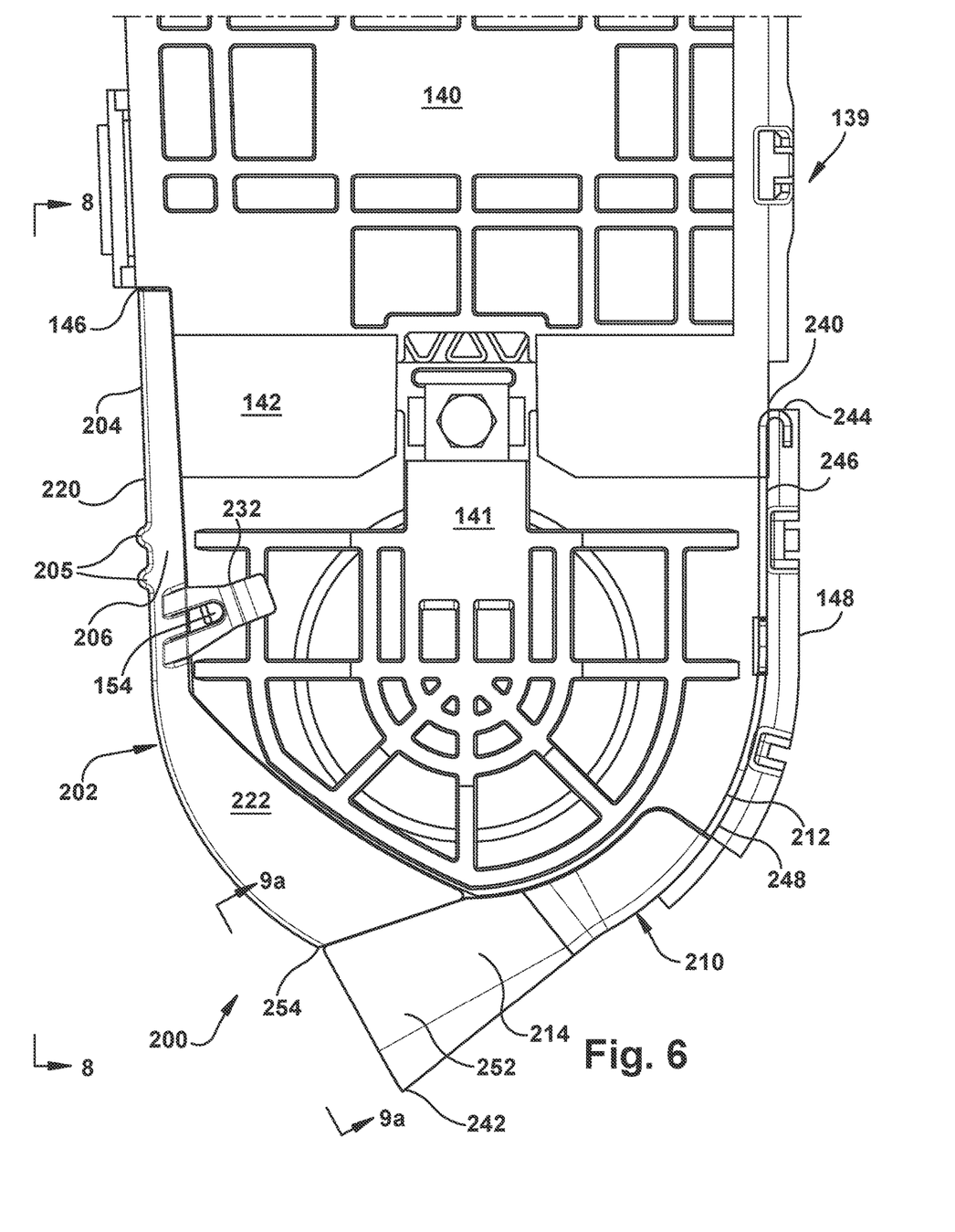
FIG. 6 is a front elevational view of FIG. 4.

With continued reference to the housing 140, the housing may further comprise a first side 142 and a second side 144 oppositely disposed form the first side 142. A rear edge wall 146 may be operably connecting the first side 142 and the second side 144. A front edge wall 148 may be oppositely disposed from the rear edge wall 146 and be operably connected to the first side 142 and the second 144. The housing 140 may have a first opening (not shown) through which commodity, such as seed, may be received and a second opening 134 through which commodity exits before it is disposed into the targeted furrow.

A commodity debris guard 200 for a commodity delivery apparatus for transferring a commodity to a furrow is described. The commodity debris guard 200 may comprise a first debris guard 202 and a second debris guard 210. The first debris guard 202 and the second debris guard 210 may operatively connect or be fixed directly to the support member 139, such as the housing 140 and/or the idler body 141. In some implementations, the first debris guard 202 may be coupled to the housing 140. Alternatively, the first debris guard 202 may be fixed directly to the housing 140. Still further, the first debris guard 202 may be coupled to the idler body 141. Alternatively, the first debris guard 202 may be fixed directly to the idler body 141. In some implementations, the second debris guard 210 may be coupled to the housing 140. Alternatively, the second debris guard 204 may be fixed directly to the housing 140. Still further, the second debris guard 204 may be coupled to the idler body 141. Alternatively, the second debris guard 204 may be fixed directly to the idler body 141.

The first debris guard 202 may be operably connected to the housing 140. The first debris guard 202 may comprise a base 204 and upwardly extending side portions 206. The first debris guard 202 may be configured to mitigate debris from contacting the endless member 170 positioned at least partially within the housing 140. The upwardly extending side portions 206 may be configured to assist the mitigation of debris entering the housing 140 and contacting or engaging with the endless member 170 and thus, the metering system.

The first debris guard 202 may comprise an upper substantially linear portion 220 and a lower curved portion 222. The upper substantially linear portion 220 and the lower curved portion 222 each comprising the base 204 and upwardly extending sidewalls 206. In one example, the base 204 of the substantially linear portion 220 may comprise ribbing 205 for increased rigidity and strength. In one implementation, the upwardly extending sidewalls 206 may generally increase in length from a first end 226 to the first debris guard to a second end 228 of the first debris guard 202. In one implementation, the length of the upwardly extending sidewalls 206 may be of sufficient length to cover or substantially cover the endless member 170. As shown in the FIGURES, the upwardly extending sidewalls 206 of the lower curved portion 222 may increase along the curve of the lower curved portion 222. The length of the upwardly extending sidewall is shorter proximate the linear portion 220, and as the lower curved portion 222 extends along the curve towards the front edge wall 148 of the housing 140, the length increases. The length of the upwardly extending sidewall 206 may be greatest proximate the second end 228 Proximate the first end 226, the first debris guard 202 may comprise a tab 230. The tab 230 may be operably connected to the first end 226. The tab 230 may have a width w that may be less than a width of the first debris guard 202. The tab 230 may slidably engage and into a slot 152 of the housing 140.

A forked attachment body 232 may provide additional operational engagement between the first debris guard 202 and the idler body 141. Two fork sections 234 terminate in a base section 236 defining an opening 238 therebetween. A stud 154 may extend from the first side 142 of the housing. When the first debris guard 202 is positioned, the stud may be disposed at least partially or completely through the opening 238 to provide another attachment location between the first debris guard 202 and the housing 140. Further, the base 204 may be proximate the endless member 170, and one upwardly extending sidewall 206 may be proximate the first side 142 of the housing 140 and the other upwardly extending sidewall 206 being proximate the second side 144 of the housing.

Figure 7:
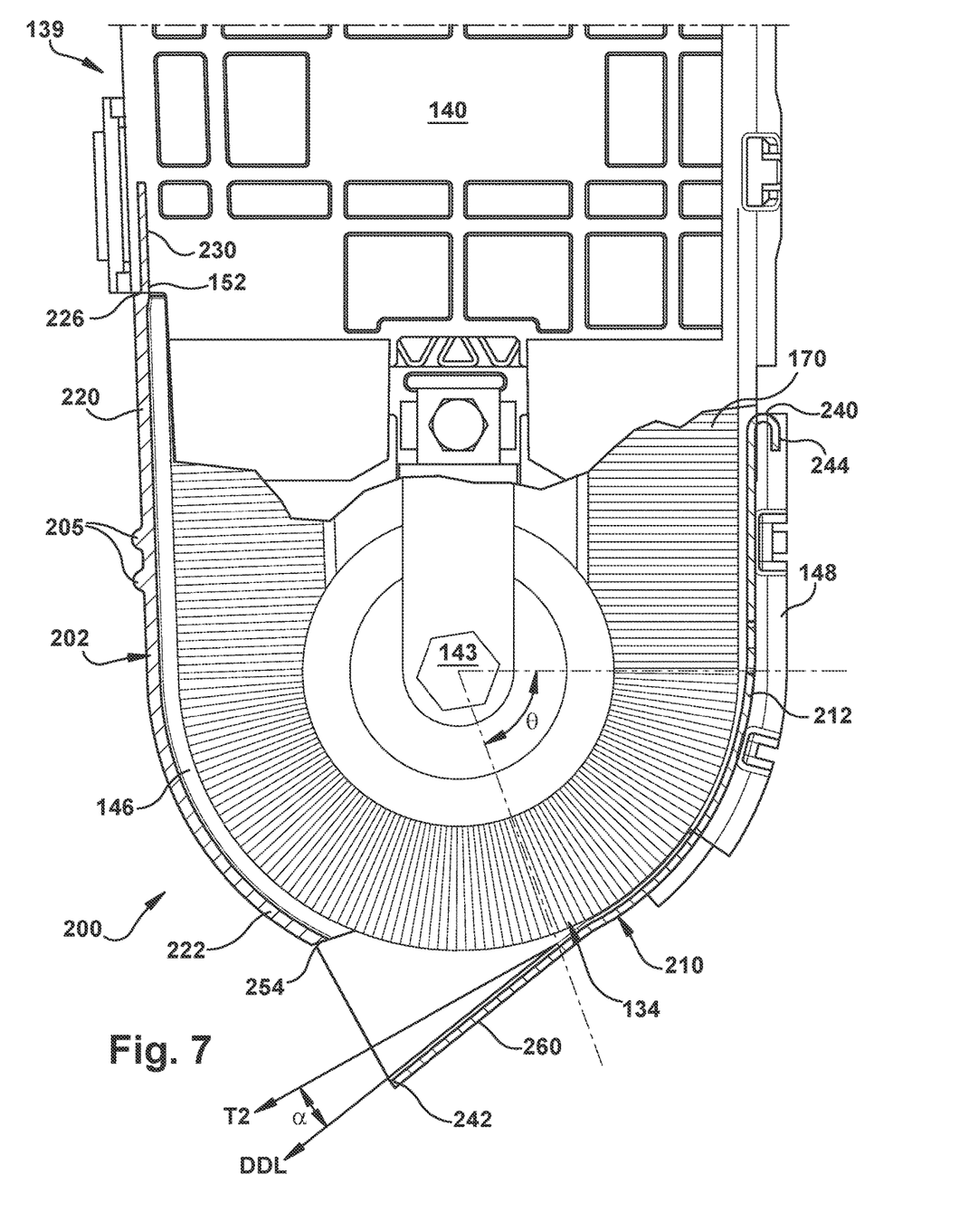
FIG. 7 is a cross sectional view of FIG. 4.
Figures 8, 9A, 9B, 9C, 9D, 9E:
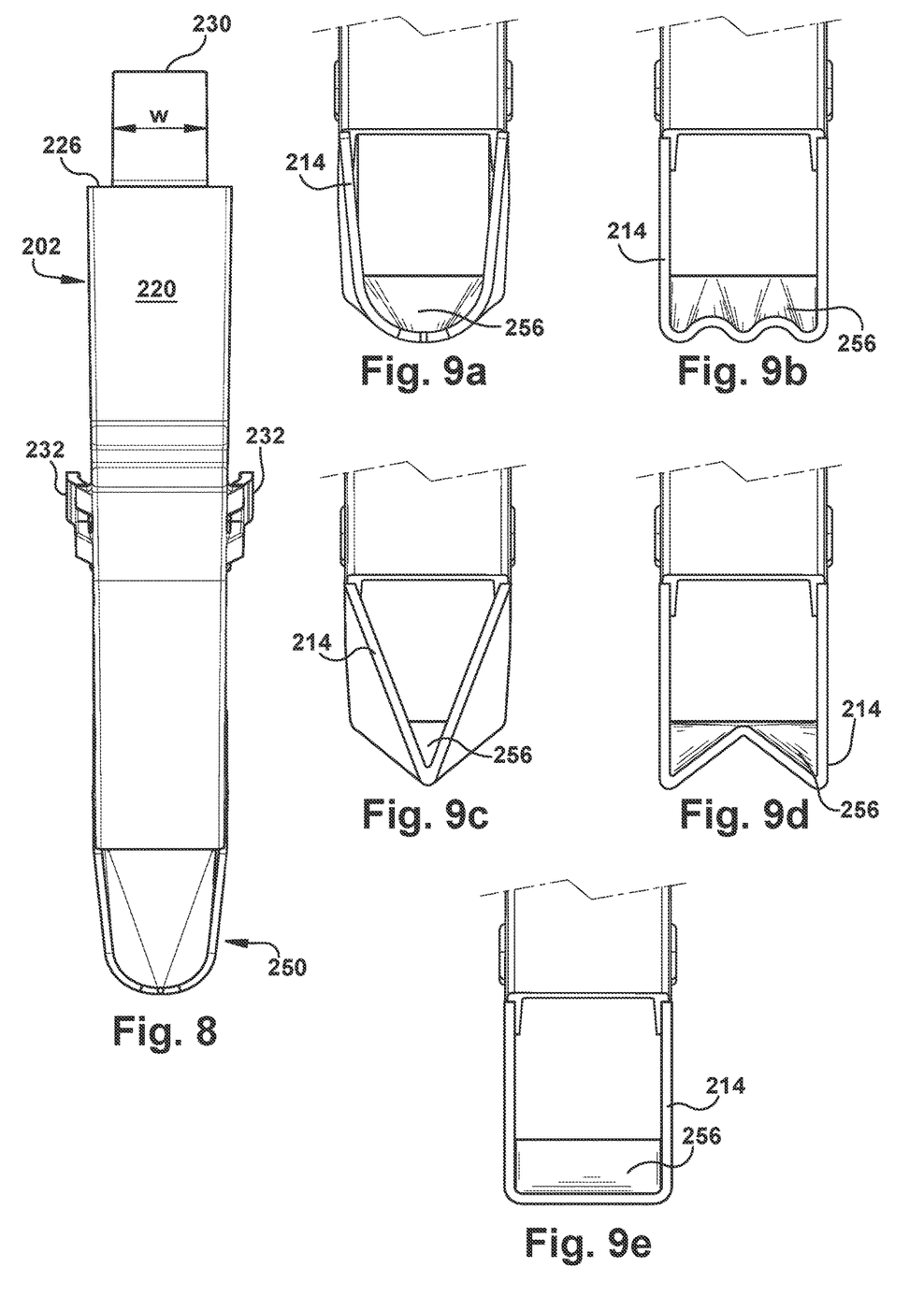
FIG. 8 is a rear elevational view taken along line 8-8 of FIG. 6.
FIG. 9a is an example implementation of a profile a guard taken along line 9a-9a of FIG. 6.
FIG. 9b is an example implementation of a profile a guard taken along line 9a-9a of FIG. 6.
FIG. 9c is an example implementation of a profile a guard taken along line 9a-9a of FIG. 6.
FIG. 9d is an example implementation of a profile a guard taken along line 9a-9a of FIG. 6.
FIG. 9e is an example implementation of a profile a guard taken along line 9a-9a of FIG. 6.

A second debris guard 210 may be operably connected to the support member 139, such as the idler body 141 and disposed forward and below the first debris guard 202. The second debris guard 210 may be configured to mitigate debris from entering the housing 140 and contacting the endless member 170. The second debris guard 210 may have a first end 240 and a second end 242 oppositely disposed from the first end 240. A base 212 may extend between the first end 240 and the second end 242. The first end 240 may terminate in a hooked portion 244 that may bend away from the housing 140. The second debris guard 210 may comprise an upper substantially linear portion 246 and a lower curved portion 248. The upper substantially linear portion 246 may further comprise two flanges 249 extending outwardly from the base 212 that may operably connect the second debris guard 210 to the support member 139, such as the idler body 141. The lower curved portion 248 may comprise upwardly extending side portions 214 that may be operably connected to the base 212. The upwardly extending side portions 214 may have a length that generally increase along the curve to at partially cover or substantially cover the endless member 170. The length of the upwardly extending side portions 214 may be greatest proximate the second end 242 of the second debris guard 210. Further, the upper substantially linear portion 246 may be proximate the front edge wall 148 of the housing 140. In another implementation, the upper substantially linear portion 246 may be disposed between the front edge wall 148 of the housing 140 and the endless member 170. Further, the hooked portion 244 may over hang a portion of the front edge wall 148 of the housing 140 to secure the second debris guard 210 in place. One upwardly extending sidewall of the lower curved portion 248 may be proximate the first side 142 of the housing 140 and the other upwardly extending sidewall being proximate the second side 144 of the housing 140.

With continued reference to the FIGURES, the lower curved portion 222 may be operably connected to the extension member 250. The extension member 250 may comprise an extension portion 252 having an upper edge 254. The base 212 of the extension portion 252 may be proximate the endless member 170. The upper edge 254 of the extension portion 252 may be proximate the lower curved portion 222 of the first debris guard 202.

The second debris guard 210 may be configured to mitigate debris from contacting the endless member 170 positioned at least partially within the housing 140. The upwardly extending side portions 214 are configured to assist the mitigation of debris entering the housing 140 and contacting or engaging with the endless member 170 and thus, the seed delivery system 100.

It should be understood that a variety of variations may be contemplated with the commodity debris guard 200. In one implementation, only the first debris guard 202 may be utilized to mitigate debris from entering the housing 140 or engaging with the endless member 170. In another implementation, only the second debris guard 210 may be utilized to mitigate debris from entering the housing 140 or engaging with the endless member 170. In yet another implementation, both the first debris guard 202 and the second debris guard 210 may be utilized to mitigate debris from entering the housing 140 or engaging with the endless member 170.

In another implementation, the second debris guard 210 may comprise the extension member 250 to further enhance placement of the commodity, such as seed, to an underlying surface. In one implementation, the extension member may have an extension portion 252 that may be configured to channel the commodity, such as seed, as it exits the extension portion 250 to an associated furrow of an underlying surface.

In one implementation, the extension portion 252 may be configured to extend substantially along a tangent line TL extending from the commodity lower (second) opening 134.

In yet another implementation, a drop down body 260 may comprise the tangent line TL and a drop down line DDL forming a drop down angle α therebetween. The drop down angle α may reduce dynamic impact on upward accelerations acting on the commodity, such as seed, for better placement in the furrow. The drop down angle α may range from about zero degrees to about thirty degrees. In another implementation, the drop down angle α may be about 10 degrees. In yet another implementation, the support member 139, such as the idler body 141, may comprise a ramp angle θ, defined between a substantially horizontal line intersecting a center point 143 of a pulley disposed in the idler body 141. In one implementation, the ramp angle θ may be chosen with sound engineering judgment, and is contemplated to be about 45 degrees, 50 degrees, 55 degrees, 60 degrees, 65 degrees, 70 degrees, 75 degrees, 80 degrees or 85 degrees. In one implementation, as the ramp angle θ decreases, the drop down angle increases. In one implementation, as the ramp angle decreases from less than 90 degrees down to about 40 degrees, the drop down angle α increases from about greater than zero degrees to about thirty degrees. It is also contemplated that the drop down angle θ may be about zero degrees and coincident with an extension bottom 256 of the extension portion 252.

With references to FIGS. 9a-9e, the extension portion 252 may comprise a cross section profile formed from the bottom 256 and the upwardly extending side walls 214. The cross section profile being one of a parabola, one more undulating contours, a triangle, a w-shape, a square, a rectangle, a curve, or semi-circular.

Figure 10:
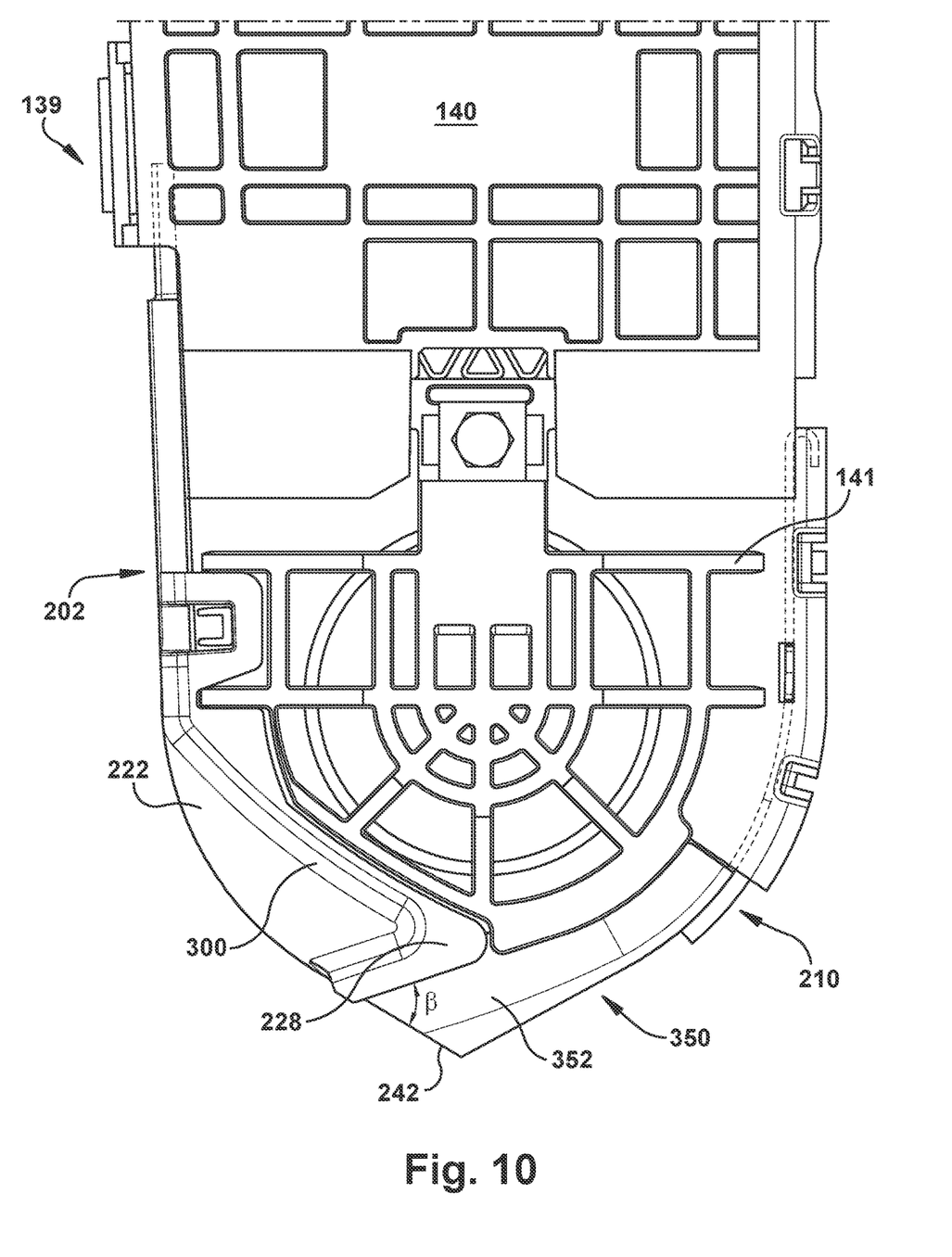
FIG. 10 is an example implementation illustrating front view of a component of an agricultural vehicle configured to deliver a commodity to the ground.
Figure 11:
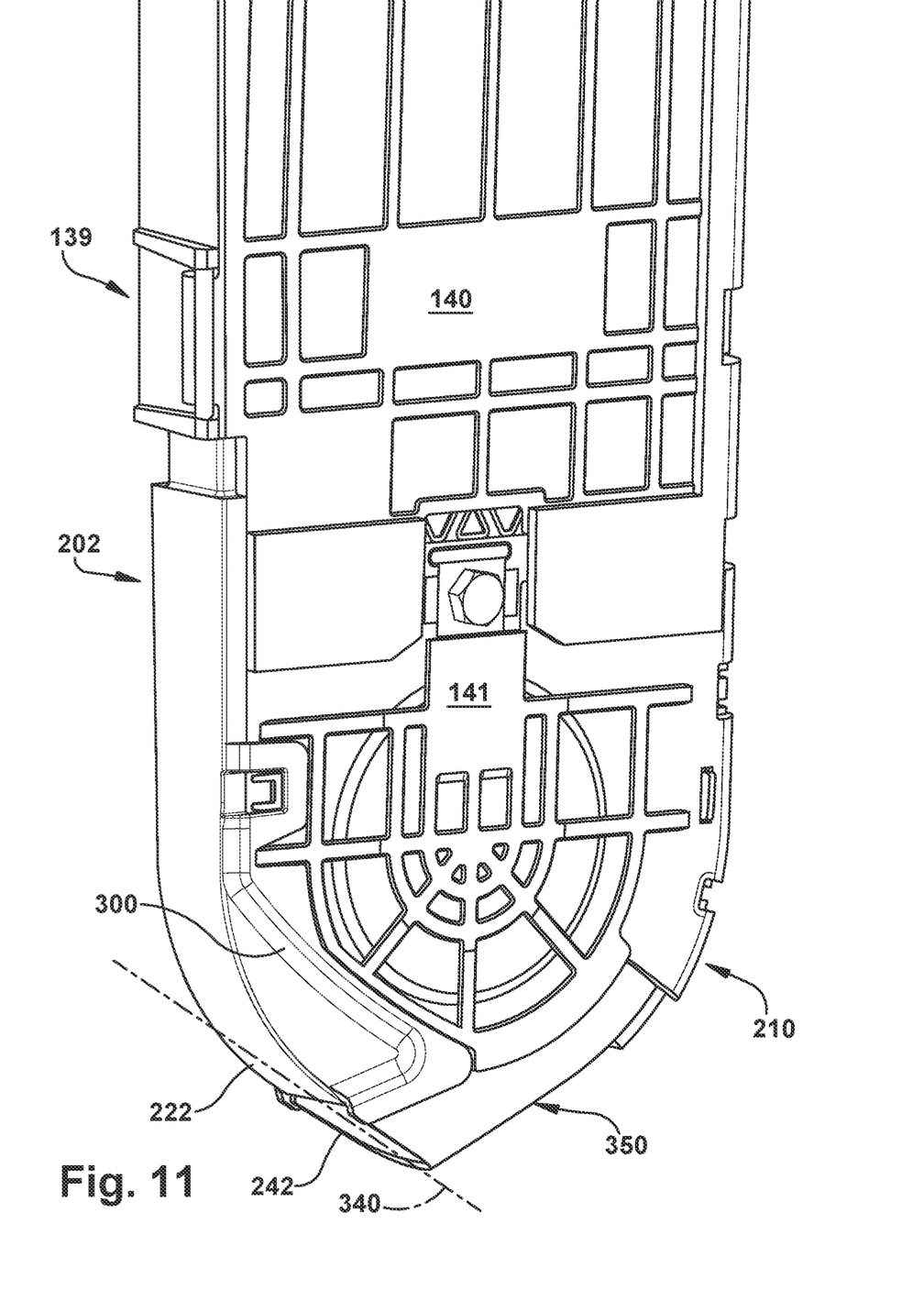
FIG. 11 is an example implementation illustrating a perspective view of FIG. 10.
Figure 12:
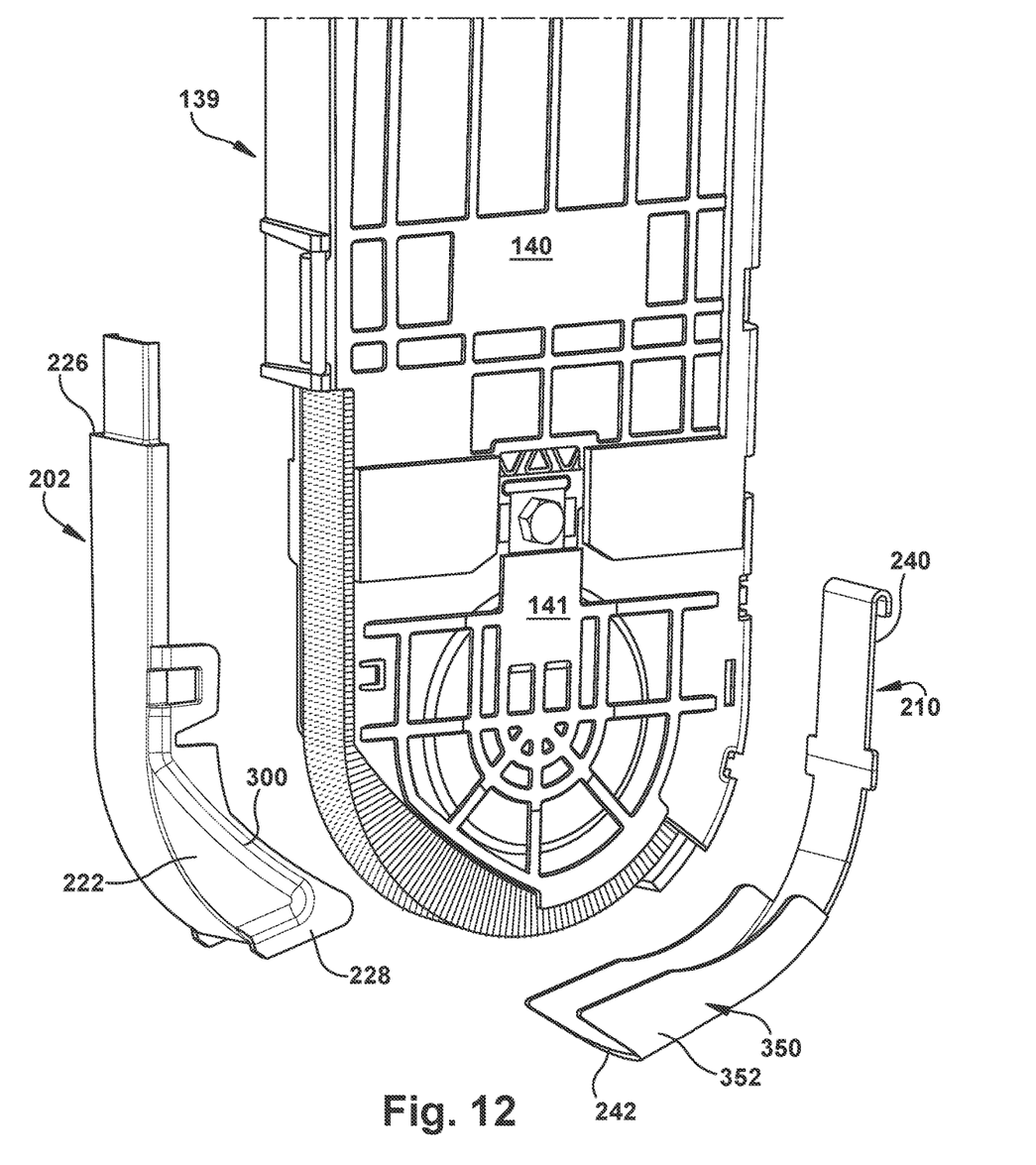
FIG. 12 is an example implementation illustrating an exploded view of FIG. 11.

With reference to FIGS. 10-12, an implementation of debris guard 200 is shown. The first debris guard 202 and the second debris guard 210 are of similar construction as previously described. As shown in FIGS. 10-12, the lower curved portion 222 of the first debris guard 202 may comprise a rib 300 about a portion of its upper perimeter for additional rigidity and strength. The second debris guard 210 may comprise an extension member 350. The extension member 350 may comprise an extension portion 352. An upper edge 354 may be proximate the lower curved portion 222 and second end 228 of the first debris guard 202 when installed. The extension member 350 may be shortened such that the second end 242 does not extend beyond the lower curved portion 222 of the first debris guard. In another implementation, the second end 242 of the second debris guard 210 may form a tangent line 340 with the lower curved portion 222. In some implementations, the second end 242 of the second debris guard 210 may form an angle β with the second end 228 of the first debris guard 202. Angle β may be an acute angle. In some implementations, angle β may be between about 80 degrees and about 30 degrees. In other implementations, it may be about 45 degrees. With a shortened extension member 350, there is more space from the extension member 350 where the commodity exits and the underlying surface. This may be helpful with uneven terrain to prevent engagement of the extension member 350 and the debris guard 202, 210 with the underlying surface.

Figure 13:
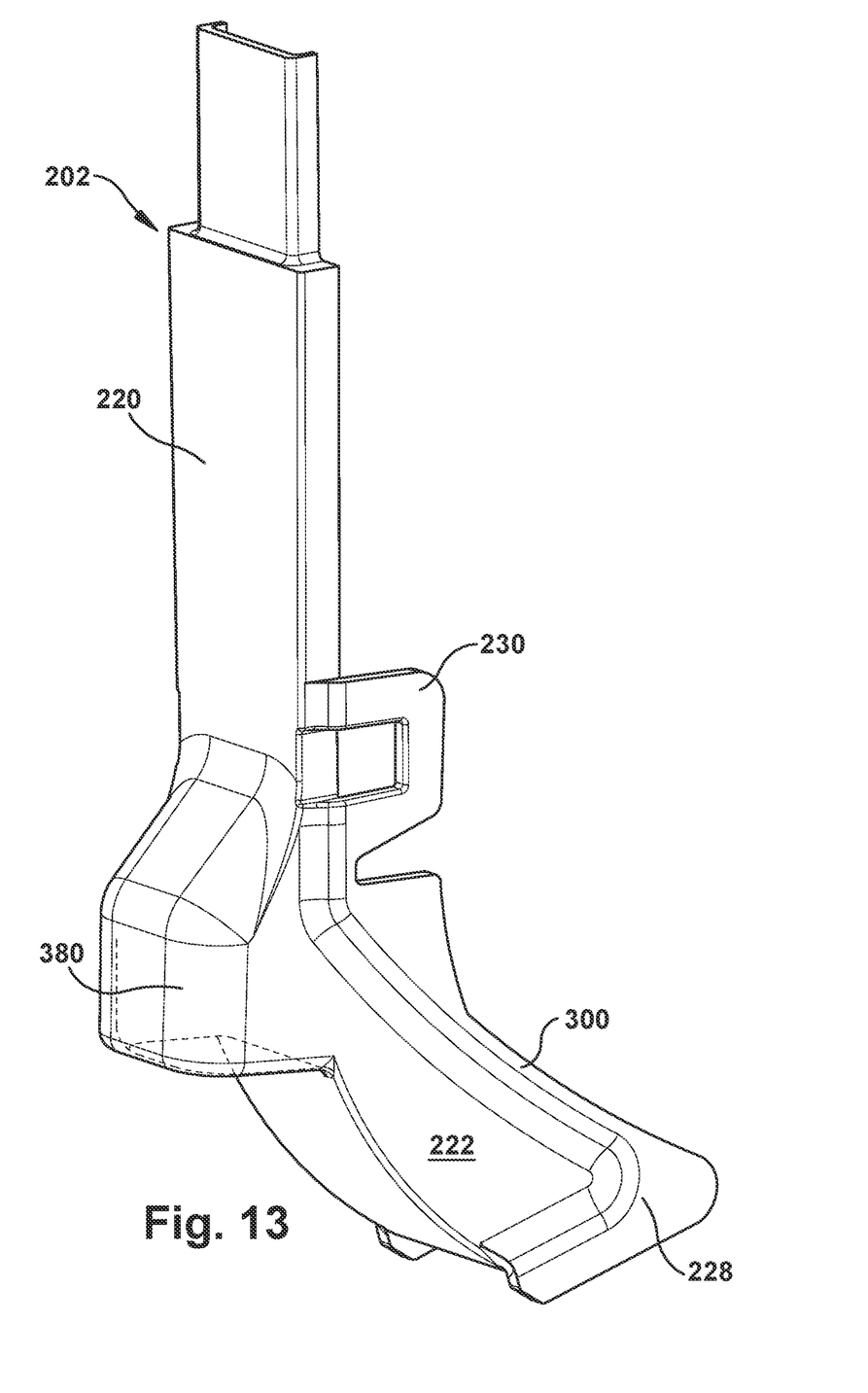
FIG. 13 is a perspective view of an example implementation of a debris guard.

FIG. 13 illustrates an implementation of the first debris guard 202. A commodity protrusion body 380 may extend outwardly between the linear portion 220 and the curved portion 222. The commodity protrusion body 380 may provide additional strength and rigidity to the first debris guard 202. Further the commodity protrusion body 380 may further protect the endless member 170 from encountering large debris such as hulls from commodities or other objects and materials that may be carried around the endless member 170. Additionally, the commodity protrusion body 380 may be configured to enable commodity hulls to be discharged without significantly interacting with the endless member 170. The commodity protrusion body 380 may also prevent fertilizer over-spray from contacting the endless member 170. The commodity protrusion body 380 may be a rectangular or square shaped body. However, any shape or configuration may be utilized to assist with exiting hulls from commodities.

The foregoing description and examples has been set forth merely to illustrate the disclosure and are not intended as being limiting. Each of the disclosed aspects and embodiments of the present disclosure may be considered individually or in combination with other aspects, embodiments, and variations of the disclosure. In addition, unless otherwise specified, none of the steps of the methods of the present disclosure are confined to any particular order of performance. Modifications of the disclosed embodiments incorporating the spirit and substance of the disclosure may occur to persons skilled in the art and such modifications are within the scope of the present disclosure. Furthermore, all references cited herein are incorporated by reference in their entirety.

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the non-exclusive embodiments and examples that are illustrated and described in this disclosure, or that are discussed during the prosecution of the application.

Although systems and methods for a commodity debris guard have been disclosed in the context of certain embodiments and examples, this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of systems and methods for a commodity debris guard. The scope of this disclosure should not be limited by the particular disclosed implementations described herein.

Certain features that are described in this disclosure in the context of separate implementations can be implemented in combination in a single implementation. Conversely, various features that are described in the context of a single implementation can be implemented in multiple implementations separately or in any suitable subcombination. Although features may be described herein as acting in certain combinations, one or more features from a claimed combination can, in some cases, be excised from the combination, and the combination may be claimed as any subcombination or variation of any subcombination.

While the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various embodiments described and the appended claims. Further, the disclosure herein of any particular feature, aspect, method, property, characteristic, quality, attribute, element, or the like in connection with an embodiment can be used in all other embodiments set forth herein. Any methods disclosed herein need not be performed in the order recited. Depending on the embodiment, one or more acts, events, or functions of any of the algorithms, methods, or processes described herein can be performed in a different sequence, can be added, merged, or left out altogether (e.g., not all described acts or events are necessary for the practice of the algorithm). In some embodiments, acts or events can be performed concurrently, e.g., through multi-threaded processing, interrupt processing, or multiple processors or processor cores or on other parallel architectures, rather than sequentially. Further, no element, feature, block, or step, or group of elements, features, blocks, or steps, are necessary or indispensable to each embodiment. Additionally, all possible combinations, subcombinations, and rearrangements of systems, methods, features, elements, modules, blocks, and so forth are within the scope of this disclosure. The use of sequential, or time-ordered language, such as "then," "next," "after," "subsequently," and the like, unless specifically stated otherwise, or otherwise understood within the context as used, is generally intended to facilitate the flow of the text and is not intended to limit the sequence of operations performed. Thus, some embodiments may be performed using the sequence of operations described herein, while other embodiments may be performed following a different sequence of operations.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described herein should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying figures. Certain figures are drawn and/or shown to scale, but such scale should not be limiting, since dimensions and proportions other than what are shown are contemplated and are within the scope of the embodiments disclosed herein. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

The methods disclosed herein may include certain actions taken by a practitioner; however, the methods can also include any third-party instruction of those actions, either expressly or by implication. For example, actions such as "positioning an electrode" include "instructing positioning of an electrode."

The ranges disclosed herein also encompass any and all overlap, subranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 1 V" includes "1 V." Phrases preceded by a term such as "substantially" include the recited phrase and should be interpreted based on the circumstances (e.g., as much as reasonably possible under the circumstances). For example, "substantially perpendicular" includes "perpendicular." Unless stated otherwise, all measurements are at standard conditions including temperature and pressure.

In summary, various embodiments and examples of systems and methods for the commodity debris guard have been disclosed. Although the systems and methods for the commodity debris guard have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described herein, but should be determined only by a fair reading of the claims that follow.

What is claimed is:

1. A commodity debris guard for a commodity delivery apparatus for transferring a commodity to a furrow, the commodity debris guard comprising:
   a first debris guard operably connected to a support member and configured to mitigate debris from contacting an endless member positioned at least partially within a housing of the support member, the first debris guard comprising a base configured to face a rear of the endless member and upwardly extending side portions configured to cover sides of the endless member, the housing having a first opening through which commodity is received and a second opening through which commodity exits;
   a second debris guard operably connected to the support member and disposed forward and below the first debris guard, the second debris guard configured to mitigate debris from contacting the endless member, the second debris guard comprising:
      a first end and a second end oppositely disposed from the first end comprising a base section therebetween configured to face a front of the endless member;
      upwardly extending side portions proximate the second end configured to cover sides of the endless member; and
      an extension member formed by the base section and upwardly extending side portions configured to channel commodity as it exits the extension member to an associated furrow of an underlying surface, the extension member comprising one or more of:
         an extension portion configured to extend substantially along a tangent line extending from the second opening; and
         a drop down body comprising the tangent line and a drop down line extending along a length of the drop down body forming a drop down angle α therebetween, the drop down angle being from about zero degrees to about thirty degrees.

2. The commodity debris guard of claim 1, wherein the drop down angle α is about ten degrees.

3. The commodity debris guard of claim 1, wherein the support member comprises a ramp angle θ, wherein the drop down angle α increases from about zero degrees to about thirty degrees as the ramp angle θ decreases.

4. The commodity debris guard of claim 1, wherein the endless member is a brush belt.

5. The commodity debris guard of claim 1, wherein the endless member is a flighted belt.

6. The commodity debris guard of claim 1, wherein the endless member is a conveyor belt.

7. The commodity debris guard of claim 1, wherein the housing of the support member further comprises:
   a first side;
   a second side oppositely disposed from the first side;
   a rear edge wall operably connecting the first side and the second side; and
   a front edge wall operably connecting the first side and the second side.

8. The commodity debris guard of claim 7, wherein the first debris guard comprises an upper substantially linear portion and a lower curved portion, the upper substantially linear portion and the lower curved portion each comprising the base and the upwardly extending sidewalls, the base being proximate the endless member and one upwardly extending sidewall being proximate the first side of the housing and the other upwardly extending sidewall being proximate the second side of the housing.

9. The commodity debris guard of claim 1, wherein the second debris guard comprises an upper substantially linear portion and a lower curved portion, the lower curved portion operably connected to the extension member, the upwardly extending side portions having an upper edge at the extension member, the upper edge of the extension member abutting a lower edge of a lower curved portion of the first debris guard.

10. The commodity debris guard of claim 1, wherein the extension portion comprises a cross section profile, the cross section profile being one of a parabola, one more undulating contours, a triangle, a w-shape, a square, a rectangle, a curve, or semi-circular.

11. The commodity debris guard of claim 1, wherein the second debris guard further comprises an extension member configured to channel commodity as it exits the extension member to an associated furrow of an underlying surface.

12. The commodity debris guard of claim 11, wherein the extension member further comprises an extension portion configured to extend substantially along a tangent line extending from an opening configured to discharge commodity from the housing.

13. The commodity debris guard of claim 11, wherein the extension portion comprises a cross section profile, the cross section profile being one of a parabola, one more undulating contours, a triangle, a w-shape, a square, a rectangle, a curve, or semi-circular.

14. A commodity debris guard for a commodity delivery apparatus for transferring a commodity to a furrow, the commodity debris guard comprising:
a first debris guard operably connected to a support member, the first debris guard comprising a base and upwardly extending side portions extending from the base, the first debris guard configured to mitigate debris from contacting an endless member positioned at least partially within a housing of the support member; and
a second debris guard operably connected to the support member and disposed forward and below the first debris guard, the second debris guard configured to mitigate debris from contacting the endless member, the second debris guard comprising a base and upwardly extending side portions extending from the base,
wherein upper edges of the upwardly extending side portions of the second debris guard abut respective lower edges of the upwardly extending side portions of the first debris guard.

15. The commodity debris guard of claim 14, wherein the second debris guard further comprises a drop down body comprising a tangent line and a drop down line forming a drop down angle $\alpha$ therebetween, the drop down angle $\alpha$ being from about zero degrees to about thirty degrees.

16. The commodity debris guard of claim 15, wherein the second debris guard further comprises an extension portion configured to extend substantially along the tangent line extending from an opening of the support member.

17. The commodity debris guard of claim 14, wherein the second debris guard further comprises a first end and a second end, the first debris guard further comprises a first end and second end, wherein the second end of the second debris guard and the second end of the first debris guard form an angle $\beta$, wherein angle $\beta$ is an acute angle.

18. The commodity debris guard of claim 14, wherein the second debris guard further comprises:
an extension portion configured to extend substantially along a tangent line extending from an opening configured to discharge commodity from the housing; and
a drop down body comprising the tangent line and a drop down line forming a drop down angle $\alpha$ therebetween, the drop down angle being from greater than about zero degrees to about thirty degrees.

19. The commodity debris guard of claim 14, wherein the housing further comprises:
a first side;
a second side oppositely disposed form the first side;
a rear edge wall operably connecting the first side and the second side; and
a front edge wall operably connecting the first side and the second side;
wherein, the first debris guard comprises:
an upper substantially linear portion; and
a lower curved portion, the upper substantially linear portion and the lower curved portion each comprising the base and upwardly extending sidewalls, the base being proximate the endless member and one upwardly extending sidewall being proximate the first side of the housing and the other upwardly extending sidewall being proximate the second side of the housing.

* * * * *